Patented May 22, 1951

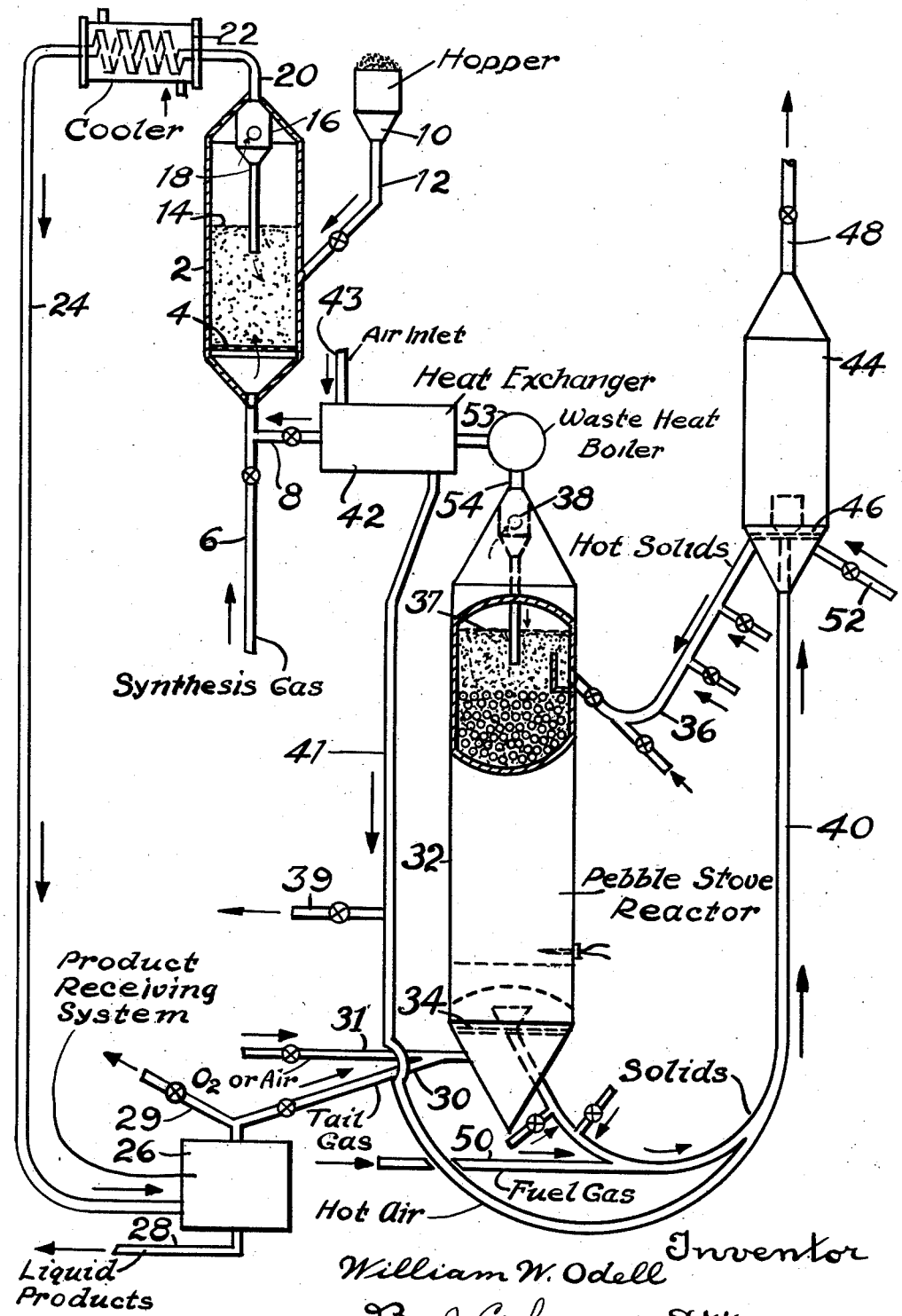

2,554,264

UNITED STATES PATENT OFFICE 2,554,264

PROCESS FOR TREATING HYDROCARBON SYNTHESIS TAIL GAS

William W. Odell, Washington, D. C., assignor to Standard Oil Development Company, a corporation of Delaware Application October 26, 1948, Serial No. 56,632

5 Claims. (Cl. 260—449.6)

The present invention relates to the catalytic conversion of carbon oxides with hydrogen to form valuable hydrocarbons and oxygenated organic products. More particularly, the present invention relates to a process for conditioning the off gases from this synthesis prior to their recirculation to the process.

The production of valuable hydrocarbons and oxygenated hydrocarbons from mixtures of hydrogen and oxides of carbon in the presence of catalyst of the iron group and under well-defined conditions of temperature, pressure, and contact time is well known in the art. The products obtained usually are a function of the above conditions, and vary in type, yield, configuration, and molecular weight. Liquid paraffinic and olefinic hydrocarbons and oxygenated organic compounds are the usual products obtained in reactions of this type, but higher boiling hydrocarbons and waxes may also be produced. Secondary reaction and by-products consist mainly of water, carbon dioxide, gaseous hydrocarbons of varying degrees of unsaturation, and carbonaceous solid material, such as coke and fixed carbon.

The catalytic conversion of CO and $H_2$ can be carried out in fixed bed, moving bed, slurry, and fluidized catalyst types of operation. The advantages of the latter, such as improved heat distribution, transfer, and control, and intimate mixing and contact of the catalyst with the ractants are well known. In these operations it has also been found that a promoted iron catalyst at somewhat more severe reaction conditions than those used with a cobalt catalyst will give a product of considerably higher olefinic content and greater suitability for use as a motor fuel than the product obtained with a cobalt catalyst. Two problems that arise in all types of operation employing an iron catalyst, but particularly in conjunction with the fluid solids type of operation, are the fouling and consequent inactivation of the catalyst by deposition of carbonaceous material, and the tendency of the catalyst particles to disintegrate, presumably because of said deposition.

The carbonaceous material deposited on the surface of such iron-base catalysts appear to be formed as a result of disassociation of CO and of unstable hydrocarbons formed during the synthesis operation. This contamination of the catalyst occurs mainly when the synthesis reaction is productive of good yields of high octane hydrocarbons. The corresponding reaction conditions are for example, temperatures of about 600° F. and above, and feed gas molar ratios of about 0.8:1 to 2:1 of $H_2$ to CO, and pressures of 250-600 p. s. i. g. These are generally considered severe reaction conditions.

Also, during the hydrocarbon synthesis process, the CO, $H_2$, and unstable gases present in the synthesis gas not only contact the external surface of the iron catalyst but apparently penetrate the interior of the individual particles and, as the process proceeds, carbonaceous deposits and elementary carbon form and are deposited within the catalyst, usually along the lines of structural weakness, causing a weakening of the catalyst so that, as the synthesis operation proceeds, the catalyst physically disintegrates into particles of such small size that eventually fluidization becomes difficult, that is, it becomes difficult to maintain the particles in a dense, turbulent ebullient mass by means of a gasiform fluidizing agent, here the synthesis feed gases. A satisfactory fluidized catalyst mass for the hydrocarbon synthesis reaction generally comprises particles of sizes from about 10 to 200 microns, and a particle size distribution in which up to about 30% of the particles are below 20 microns and up to about 40% are greater than 80 microns. Such a fluidized mass under severe synthesis conditions tends to undergo fragmentation with the production of fines and as a result of poor fluidization behavior of the fines, and also excessive accumulation of carbon and carbonaceous material on the catalyst, both uniformity of fluidization and activity of the catalyst fall off. This decline in activity and catalyst deterioration occurs not only in fluid but also in moving and fixed bed types of operation.

As has been mentioned above, one of the sources of this carbon formation is the presence of relatively unstable organic compounds in the synthesis reactor. These products, such as acetylenes, low molecular weight aldehydes, diolefins, and other deleterious substances are formed in the synthesis or possibly result as secondary reaction products from the production of synthesis gas. They pass in part out of the synthesis reactor along with the other vaporous reaction products, but are not condensed or absorbed or otherwise removed in the plant liquid-product recovery systems, and are thus recycled to the synthesis reactor as a constituent of the tail gas, or recycle gas. Within the reactor these products interact to form the carbonaceous deposits mentioned above and shorten the life of the catalyst.

It is an object of the invention to economically treat and beneficiate tail gas from the hydrocarbon synthesis process and to remove substances deleterious to the catalyst therefrom prior to recirculating said tail gas to the hydrocarbon synthesis reactor.

Another object of this invention is to convert simultaneously a substantial portion of the $CO_2$ which may be present in the tail gas to carbon monoxide and hydrogen.

Other objects of the invention will appear from the subsequent description thereof.

In accordance with the invention, synthesis gas containing a hydrogen to carbon monoxide molar ratio of about 0.8–2 to 1 is fed to a hydrocarbon synthesis reactor, containing a bed of fluidized iron catalyst. After the desired conversion has taken place, the total overhead from the synthesis reactor is cooled and liquid reaction products are separated from the tail gas. The latter gas is then subjected to contact with hot, finely divided solids flowing countercurrently while said solids and gas are flowing through a pebble stove. The solids are at a temperature within the range of 1200°–2200° F., but preferably 1600°–1800° F., and the time of contact is adjusted to promote the desired beneficial effect upon the tail gas, i. e., decomposing and removing aldehydes, acetylenic compounds, diolefins and other gum formers and deleterious substances which shorten the life of the catalyst. Furthermore, an additional advantage is achieved when the hot solids are carbonaceous, such as coke. In the latter case, some of the $CO_2$ present in the tail gas will be reduced to CO and thus increase the concentration of that constituent in the recycle gas to the synthesis reactor. Also, by suitable control of temperature, the gaseous hydrocarbons in the tail gas may be reformed to CO and $H_2$, all to be more fully detailed below.

The hot circulating solids after conditioning the tail gas and imparting some of their sensible heat thereto, and thereby partly cooled, are then recirculated to a regenerating or heating section, and then recycled to the system, and the tail gas, now substantially free of deleterious substances, is recycled to the synthesis reactor and may be, if desired, mixed with the cooler fresh feed before the whole is introduced into the hydrocarbon synthesis reactor.

Having set forth the general nature, advantages, and objects of the invention, the latter will best be understood from the more detailed description hereinafter, in which reference will be made to the accompanying drawing which is a diagrammatic representation of a system suitable for carrying out a preferred embodiment of the invention.

Referring now in detail to the drawing, 2 is a fluid catalyst hydrocarbon synthesis reactor, preferably in the form or a vertical cylinder with a conical base and having a screen or grid 4 located in the lower section to effect good gas distribution. Within reactor 2 there is present finely divided iron type hydrocarbon synthesis catalyst of any suitable composition known in the art and having a particle size ranging from about 10–200 microns. Fresh synthesis gas mixture comprising CO and $H_2$ from any suitable source and under any desired superatmospheric pressure is passed through line 6 into reactor 2. Recycle tail gas, treated in a manner described more fully below is passed into reactor 2 via lines 8 and 6. The gas mixture entering 2, composed of fresh and recycle gas in any desired ratio, such as recycle to tail gas ratios of 2–3 to 1, has a molecular ratio of $H_2/CO$ varying, as desired, between 0.8–2.5 to 1, preferably 1.5–1.8 to 1.

The gas enters reactor 2 below grid 4, and catalyst may be passed from hopper 10 into reactor 2 through line 12.

The linear velocity of the gases within 2 is maintained in this example within the approximate range of about 0.1–1.5 feet per second, being in the upper portion of the range with dense catalyst and minimum pressures and in the lower portion of the range for high pressures and/or with relatively low density catalyst. Under these conditions the catalyst assumes the form of a dense turbulent mass, having a well defined upper level 14 and an apparent density of about 30 to 150 pounds per cubic foot depending upon the fluidization conditions. The pressure within reactor 2 is usually kept within the approximate range of 150–700 p. s. i. g., preferably between 250 and 600 p. s. i. g., and the temperature maintained within the reaction vessel 2 is preferably kept between 450°–700° F.

The heat transfer characteristics of the fluidized mass permit the maintenance of relatively uniform temperature conditions throughout the fluidized system in reactor 2. Surplus heat may be withdrawn and any heat required for starting up the process may be supplied by any conventional means. Heat exchange means are not shown in the figure since they are not pertinent to this invention but it is understood that it is essential in promoting synthesis reactions of this type that the exothermic heat of reaction must be continuously removed from the reactor.

Due to the phenomenon of hindered settling of the catalyst particles, only a small portion of the latter is carried into the zone above level 14. The portion of vessel 2 above 14 serves as a catalyst disengaging zone. Catalyst particles enter the disengaging zone and are separated from the reaction vapors and unreacted synthesis gases by passage through gas-solid separating equipment 16 which may be a cyclone or filter, etc. The separated solid particles are returned to the dense bed by means of dip pipe 18.

Vaporous reaction products and unreacted gases are withdrawn from reactor 2 through line 20, passed to cooler 22 and thence through line 24 to product recovery system 26 wherein water and the bulk of hydrocarbons and oxygenated compounds containing three or more carbon atoms are substantially separated and removed via line 28 for further processing in a manner known per se.

Tail gas, comprising unreacted synthesis gas, $CO_2$, light hydrocarbon gases such as methane, ethane, ethylene, acetylene, etc. and smaller proportions of dienes, aldehydic and acetylenic compounds, etc., is withdrawn from 26 and that portion which is used for recirculation to reactor 2 is passed into the bottom section of pebble stove 32 through line 30. The latter comprises a cylindrical reaction vessel having upper and lower conical portions, having a screen or grid 34 disposed in a lower portion, and filled to about 75% its height, say 10 to 40 feet deep, with pebbles of much greater than fluidizable size, to serve as heat transfer agents and means of economizing heat. The pebbles preferably have average diameters of about 1 to 3 inches. With fine size circulating solids and shallow pebble beds smaller pebbles are used than when larger size particles and very deep beds are employed.

Introduced into an upper portion of pebble stove reactor 32 through line 36 is a stream of finely divided solids, heated to a temperature in the range of 1200°-2200° F., preferably to 1600°-1800° F. These solids preferably comprise combustible carbon material, such as finely divided coke, and they have a suitable particle size to flow through the pebble bed, usually within the range of from about 60 to 100 mesh or smaller. The rate of solids flow into reactor 32 is adjusted so that the solids discharged at the bottom of the stove have a temperature usually of about 1100° to 1250° F., it depends upon the temperature of the solids, heat to be supplied by them and the temperature level desired within the pebble mass. The temperature of the outgoing solids is lower than that of the feed solids.

The hot solids introduced into reactor 32 through line 36 and flowing downwardly are fluidized by the tail gas flowing upwardly through grid 34 to form a deep dense bed of fluidized solids having an upper lever 37 above the level of the pebbles within reactor 32. The superficial velocity of the fluidizing medium is controlled so that the solids are fluidized in the interstices of the pebble mass and is usually in the range of 0.1 to 2.0 feet per second, preferably .1 to .4 foot per second, and the contact time of the fluidizing gas with the hot solids is greater than one second and preferably 4 to 10 seconds.

The temperature level in said fluid contacting zone is preferably between 1600°-1800° F., with a preferable maximum temperature approximately 1900° to 2000° F. The solids are heated externally as described more fully below but, if desired, additional heat may be supplied by passing a relatively small stream of combustion supporting gas, such as air or oxygen into reactor 32 through line 31 along with the tail gas and burning a portion of the latter. This is particularly beneficial when it is desired to reform a portion of the methane present in the tail gas and/or convert at least a portion of the $CO_2$ present in the tail gas to CO.

Spent solids which have been cooled by their contact with the tail gas, which in turn has absorbed heat from said solids, are continuously withdrawn from the fluidized solids bed in reactor 32 above grid 34, conveyed through line 40 and are picked up by a stream of oxidizing gas such as air, admitted through line 43, preheated in exchanger 42 and passed through line 41 and is introduced into the lower conical section of combustion vessel 44. Fuel gas, such as tail gas in amounts sufficient to supply the desired heat, is added through line 50. Vessel 44 is a conventional fluid solids reactor with a screen or grid 46 for insuring proper distribution of fluidized solids in the reactor. The carbonaceous solids from pebble stove reactor 32 are maintained in the fluidized condition in 44 by the upflowing fluidizing gases initially comprising oxidizing gases with or without fuel gas, and as a result of the combustion reactions therein, the solids are brought to a temperature preferably in the range of 1600°-1800° F. Flue gases from the combustion are withdrawn through line 48 and are passed through a waste heat boiler for steam generation. If desired, additional oxidizing fluid, such as oxygen or other gas may be admitted to 44 through line 52.

A stream of hot solids substantially at the temperature of the fluidized bed in combustion vessel 44 is withdrawn continuously through aerated standpipe 36 and is recycled to reactor 32, there to decompose products deleterious to the hydrocarbon synthesis catalyst as mentioned above.

Tail gas now substantially free from the undesired contaminants is withdrawn upwardly from pebble stove reactor 32, passed through dust separator 38, and through line 54, waste heat boiler 53, and heat exchanger 42, wherein it transfers sensible heat to the oxidizing medium going to combustion vessel 44, and the tail gas is then recycled to hydrocarbon synthesis reactor 2 through line 8. In case the pebble stove is operated at lower pressures than the reactor, the treated tail gas is compressed before recirculating it to the reactor 2.

The system as described in the embodiment admits of numerous modifications apparent to those skilled in the art. Thus the temperature in the pebble mass in reactor 32 may be controlled at the desired level by regulating the temperature of the hot solids circulated, by controlling the mass of the solids circulated, and by controlling the amount of oxidizing gas or oxygen introduced with the tail gas. The quantity of combustion-supporting fluid used with the tail gas is no more than that which may be required to maintain suitable temperatures in the reaction zone of the pebble stove; it may be zero. It is understood that the pebble-stove may be operated at either high or at substantially atmospheric pressures. Also, if larger quantities of air are required to effect cooling of the gases in exchanger 42 than are desired to be utilized in reactor 32, a portion of the heated air may, if desired, be withdrawn from the system through line 39.

The system provides many advantageous heat exchange relationships which help make the process of the invention economically attractive. Thus the hot discharging solids transmit a portion of their sensible heat to the incoming gas feed stream, thus heating the latter stream and partly cooling the solids; also the tail gas after removal of contaminants passes in heat exchange relationship with the incoming air or oxygen supplied to the solids heating unit. Furthermore, the hot recycle gas may be blended with the fresh cold feed to the synthesis reactor, economizing in preheating requirements.

It may be desirable to treat in accordance with the process of the invention, only a portion of the tail or off-gas from the hydrocarbon synthesis reactor. In the latter case, that portion of the tail gas not to be treated in accordance with the invention is withdrawn through line 29.

Although the treatment of tail gas is specifically considered in this disclosure it will be noted that, for example, motor fuel vapor initially containing undesirable gum-forming compounds can be successfully beneficiated by passage through a stove as described but at a temperature (in the pebble mass) of about 1000°-1200° F. depending on the pressure. The fine size solids circulated in this case may be catalyst, absorbent, or both. The solids circulation rate through the stove may be appreciably less in this example, and the temperature of the heated solids fed to the top of said stove from heater 44 should be of the order of about 1200° F.

Thus by the process of this invention, tail gas from the hydrocarbon synthesis plant is prepared for recirculation by passing it in countercurrent contact with finely divided hot solids while said solids and gas are flowing through a pebble stove, and as a result of said treatment, not only tail gas constitutents deleterious to hydrocarbon synthesis catalyst are destroyed, but also carbon dioxide is reconverted to carbon monoxide, further adding to the economic attractiveness of the process.

The invention comprises the novel use of a pebble stove in a continuous one-way fluid flow, wherein a gradient temperature from a maximum at one end to a minimum at the opposite end is continuously maintained while promoting chemical reactions in a fluid stream flowing through and in contact with a mass of the confined pebbles which pebbles are stationary, by passing externally heated fine size solids at an elevated temperature favorable for supplying at least a large portion of the heat required for successfully promoting said reactions. Pebble stoves are usually operated in alternate up-and-down cycles, without counter flow of fine solids and fluidizing stream.

The foregoing description and exemplary operation have been presented to show a specific application of this invention; other modifications will be obvious to those skilled in the art.

What is claimed is:

1. In the process of reacting CO with $H_2$ and making synthetic hydrocarbons in which some of the tail gas is recirculated back to the reactor along with the fresh feed (gas comprising essentially $CO+H_2$), the step of preparing the tail gas for said recirculation by passing it as a stream upwardly through and in contact with a downwardly flowing deep mass of finely divided hot solids while the temperature of said solids in at least a zone between the top and bottom of said mass in said reactor is between about 1200° F. and 1800° F. at a rate adapted to maintain said mass in said reactor in a fluidized state, at a contact time greater than one second and sufficient substantially to decompose acetylenic compounds thereby beneficiating said tail gas.

2. The process defined in claim 1 in which the said solids comprise combustible carbon.

3. The process defined in claim 1 in which the solids are finely divided coke.

4. The process defined in claim 1 in which the said finely divided solids are continuously fed into the upper portion of said reactor hot and continuously withdrawn from adjacent the bottom of said reactor at a lower temperature, the entering reactant gas stream absorbing heat from the discharging solids in said reactor.

5. In the process of reacting CO with $H_2$ and producing hydrocarbons, in which a portion of the tail gas comprising $CO_2$ and light hydrocarbon gases is recirculated back to the reactor along with the fresh feed, the steps of beneficiating the tail gas prior to its recirculation, comprising, continuously passing a stream of said tail gas along with a relatively small amount of a combustion-supporting gas upwardly through a mass of non-catalytic pebbles of greater than fluidizable size confined in a heating zone, simultaneously introducing into said last-named zone substantially continuously from above said mass a stream of finely divided hot solids comprising combustible carbon, passing these solids downwardly through said mass in contact with said pebbles and said stream, controlling the velocity of the stream of tail gas so that said solids are fluidized in the interstices of said mass, maintaining a contact time of said tail gas with said downwardly passing solids of at least one second and for a period of time sufficient to decompose acetylenic compounds in said tail gas, passing said solids out of said heating zone from beneath said mass in heat exchange relation with the feed stream of tail gas mixture thereby cooling said solids and heating the latter gas, burning a portion of the thus heated tail gas in a middle zone of said mass consuming the said combustion-supporting gas thereby raising the temperature of the solids in the latter zone to about 1600° to 1800° F., causing the $CO_2$ initially present in said tail gas to react with carbon of the thus heated solids forming CO, and removing the beneficiated gas stream from above said mass.

WILLIAM W. ODELL.

REFERENCES CITED

The following references are of record in the file of this patent:

UNITED STATES PATENTS

| Number | Name | Date |
|---|---|---|
| 1,925,151 | Odell | Sept. 5, 1933 |
| 2,405,395 | Bahlke et al. | Aug. 6, 1946 |
| 2,448,290 | Atwell | Aug. 31, 1948 |